United States Patent
Li

(10) Patent No.: US 9,856,406 B2
(45) Date of Patent: Jan. 2, 2018

(54) FLAME RETARDANT POLYCARBONATE

(71) Applicant: Covestro LLC, Pittsburgh, PA (US)

(72) Inventor: Xiangyang Li, Seven Fields, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/772,178

(22) PCT Filed: Mar. 5, 2014

(86) PCT No.: PCT/US2014/020515
§ 371 (c)(1),
(2) Date: Sep. 3, 2015

(87) PCT Pub. No.: WO2014/164096
PCT Pub. Date: Oct. 9, 2014

(65) Prior Publication Data
US 2016/0032097 A1    Feb. 4, 2016

Related U.S. Application Data

(60) Provisional application No. 61/775,806, filed on Mar. 11, 2013.

(51) Int. Cl.
*C08L 51/00*    (2006.01)
*C08L 69/00*    (2006.01)
*C09K 3/16*    (2006.01)

(52) U.S. Cl.
CPC ............... *C09K 3/16* (2013.01); *C08L 69/00* (2013.01); *Y10T 428/249958* (2015.04)

(58) Field of Classification Search
CPC ......... C08L 69/005; C08G 64/04; C09K 3/16; Y10T 428/249958
USPC ...................................................... 252/500
See application file for complete search history.

(56) References Cited

U.S. PATENT DOCUMENTS

| | | | |
|---|---|---|---|
| 4,334,053 A | 6/1982 | Freitag et al. | |
| 4,888,388 A | 12/1989 | Hongo et al. | |
| 5,030,675 A | 7/1991 | Wittmann et al. | |
| 5,204,394 A | 4/1993 | Gosens et al. | |
| 5,266,618 A | 11/1993 | Watanabe et al. | |
| 5,672,645 A | 9/1997 | Eckel et al. | |
| 5,871,570 A | 2/1999 | Koyama et al. | |
| 6,174,943 B1 | 1/2001 | Matsumoto et al. | |
| 6,329,451 B2 | 12/2001 | Matsumoto et al. | |
| 6,369,141 B1 | 4/2002 | Ishii et al. | |
| 6,518,336 B1 | 2/2003 | Yabuhara et al. | |
| 6,566,428 B1 | 5/2003 | Eckel et al. | |
| 7,977,415 B2 | 7/2011 | Rogunova | |
| 8,178,608 B2 | 5/2012 | Nakamura et al. | |
| 8,217,101 B2 * | 7/2012 | Li | C08L 69/005 524/127 |
| 2004/0059031 A1 * | 3/2004 | Seidel | C08K 5/0066 524/121 |
| 2008/0090961 A1 | 4/2008 | Li et al. | |
| 2008/0214731 A1 * | 9/2008 | Li | C08L 69/005 524/701 |
| 2011/0275743 A1 | 11/2011 | Ishii et al. | |

FOREIGN PATENT DOCUMENTS

| | | |
|---|---|---|
| CA | 1173996 | 9/1984 |
| JP | 2001031860 | 2/2001 |
| JP | 2004345657 | 12/2004 |
| JP | 2006239965 | 9/2006 |
| JP | 2008073692 | 4/2008 |
| WO | 1994011429 | 5/1994 |

OTHER PUBLICATIONS

Anti-drip agent: FS-200(G), davax, Baidu Library, pp. 1-2, Aug. 12, 2011 (English translation included).

\* cited by examiner

*Primary Examiner* — Mark Kopec
*Assistant Examiner* — Danny N Kang
(74) *Attorney, Agent, or Firm* — Richard P. Bender

(57) ABSTRACT

The present invention provides a thermoplastic molding composition comprising A) 60 to 99 percent by weight (pbw) aromatic poly(ester) carbonate having a weight-average molecular weight of at least 25,000, B) 1 to 20 parts per 100 parts resin (phr) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15, C) 2 to 20 phr phosphorus-containing compound, and D) 0.1 to 15 phr boron compound having average particle diameter of 2 to 10 microns.

12 Claims, No Drawings

FLAME RETARDANT POLYCARBONATE

CROSS REFERENCE TO RELATED APPLICATION

This application claims the benefit, under 35 USC §119(e), of U.S. provisional patent application No. 61/775,806, filed Mar. 11, 2013, entitled "FLAME RETARDANT POLYCARBONATE," the entire disclosure of which is hereby incorporated by reference.

FIELD OF THE INVENTION

The present invention relates in general to polycarbonate compositions, more specifically, the invention relates to polycarbonate compositions having improved flame-retardance.

BACKGROUND OF THE INVENTION

U.S. Pat. No. 4,888,388, issued to Hongo et al., discloses a polycarbonate resin composition comprising a polycarbonate resin (A) or a mixture (A') of a polycarbonate resin with a saturated polyester resin and/or a polyester elastomer, and a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparable interlocking fashion and having an average particle size of from 0.08 to 0.6 µm, or a mixture (B') of such a compound rubber type graft copolymer (B) with a vinyl monomer, wherein component (B) or (B') is in an amount such that the compound rubber is from 0.5 to 60% by weight based on the entire resin composition.

Wittmann et al., in U.S. Pat. No. 5,030,675, provide flame-resistant molding compounds of polycarbonate, polyalkylene terephthalate, graft polymer, fluorinated polyolefine and phosphorus compound which can be worked up into molded products and which have a particularly advantageous combination of joint line strength, dimensional stability under heat and toughness.

U.S. Pat. No. 5,871,570, issued to Koyama et al., describes a flame retardant resin composition comprising the following components (A), (B), (C), (D), (E) and (F), wherein 1-10 parts by weight of (C), 2-10 parts by weight of (D), 0.05-2 parts by weight of (E) and 0.01-10 parts by weight of (F) are contained per 100 parts by weight of a resin whose weight ratio of (A)/(B) is 75/25-90/10. (A) a polycarbonate resin whose viscosity-average molecular weight is 16,000-29,000, (B) a polyalkylene terephthalate resin, (C) a copolymer containing a rubbery polymer and at least one selected from the group consisting of aromatic vinyl monomers, vinyl cyanide monomers, acrylic acid, acrylic esters, methacrylic acid, methacrylic esters and maleimide-type monomers as components, (D) an organic phosphorus-type flame retardant, (E) a fluorocarbon-type resin, and (F) an epoxy compound not containing halogens. The flame retardant resin composition is halogen-free and said to possess well-balanced properties of flame retardancy, impact strength, heat resistance, moldability, chemical resistance and heat-induced discoloration resistance, and improved in silver streaks formation.

Matsumoto et al., in U.S. Pat. No. 6,174,943, disclose a flame retarded thermoplastic resin composition comprising (R) a thermoplastic resin comprising (A) a polycarbonate resin and (B) an aromatic polyester resin in an (A)/(B) ratio of 99/1 to 50/50 by weight, and per 100 parts by weight of the thermoplastic resin (R), (C) 0.5 to 100 parts by weight of a silicate compound and (D) 0.5 to 30 parts by weight of an organic phosphorus based flame retarder. The composition is said to exhibit excellent flame resistance and anti-drip property without containing a halogen atom and, moreover, have excellent properties such as heat resistance, mechanical strength, solvent resistance, surface property of moldings, and dimensional stability.

U.S. Pat. No. 6,329,451, issued to Matsumoto et al., describes a flame-retardant thermoplastic resin composition having incorporated therein a trace of stabilized red phosphorus, which achieves both improvement of heat resistance and flame retardation without using chlorine nor bromine and also possesses long-term heat stability and smells little. The composition comprises (A) 50 to 95 parts by weight of a polycarbonate resin and (B) 5 to 50 parts by weight of a thermoplastic polyester resin, contains (C) 0.1 to 5 parts by weight, per 100 parts by weight of the total amount of (A) and (B), of coated stabilized red phosphorus and preferably contains (D) 0.1 to 100 parts by weight, per 100 parts by weight of the total amount of (A) and (B), of a silicate compound.

Li et al., in U.S. Patent Application Publication No. 2008-0090961, provide a thermoplastic molding composition characterized by its flame retardance and impact strength. The composition contains A) 70 to 99 parts by weight of aromatic poly(ester) carbonate B) 1 to 30 parts by weight of polyalkylene terephthalate, the total weight of A) and B) being 100 parts resin, and C) 1 to 20 parts per hundred parts resin (phr) of graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, D) 2 to 20 phr of a phosphorous-containing compound, and E) 0.1 to 2 part by weight of fluorinated polyolefin.

U.S. Pat. No. 8,217,101 issued to Li, describes a thermoplastic molding composition characterized by its flame retardance. The composition contains A) aromatic poly(ester) carbonate having a weight-average molecular weight of at least 25,000, B) (co)polyester and C) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15, D) phosphorus-containing compound, E) fluorinated polyolefin and F) boron compound having average particle diameter of 2 to 10 µm.

WO 94/11429 in the name of Ogoe et al., discloses a blended composition containing polycarbonate; polyester, an acrylate polymer, and/or a styrenic thermoplastic resin; poly(tetrafluoroethylene); an acid acceptor; and a halogenated aryl phosphate; and optionally a halogenated aromatic carbonate oligomer, which composition possesses a desirable balance of ignition resistance, impact resistance and solvent resistance properties.

Urabe et al., in JP 04-345657, provide a flame retardant polycarbonate compound comprising 5-98 wt. % halogenated aromatic polycarbonate resin, 0-93 wt. % non-halogenated aromatic polycarbonate resin, 1-49 wt. % aromatic polyester resin, and 1-20 wt. % graft rubber polymer composite obtained by grafting at least one vinyl monomer onto rubber particles having a mean particle size of 0.08-0.6 µm and consisting of a polyorganosiloxane rubber and a polyalkyl (meth)acrylate rubber entangled with each other so as not to be separated from each other or 1-20 wt. % mixture of the graft rubber polymer composite with a vinyl polymer, and in which the sum of the two polycarbonate resins is 50-98 wt. % and the halogen content is 3-25 wt. %.

JP 06-239965 in the name of Urabe et al., describes a resin composition composed of (A) 50-90 wt. % of an aromatic polycarbonate resin (preferably derived from bisphenol A), (B) 2-45 wt. % of an aromatic polyester resin (e.g. polyethylene terephthalate) and (C) 3-25 wt. % of a halogenated bisphenol epoxy resin of the formula

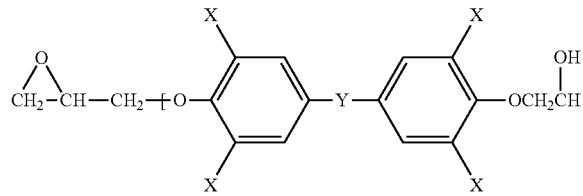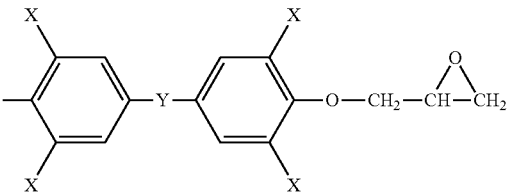

wherein X is Cl or Br; Y is alkylene, O, etc.; n is average polymerization degree and is 21-50. The component C is said to be produced by condensing a halogenated bisphenol such as dibromobisphenol A with epichlorohydrin.

Ono et al., in JP 2001-031860, disclose a flame-retardant resin composition comprising 100 wt. % of the total of 86.7-35 wt. % of an aromatic polycarbonate resin (component (a)), 10-40 wt. % of polyalkylene terephthalate resin (component b), 0.1-10 wt. % of stabilized red phosphorus (component c), 1-10 wt. % of a rubber-like polymer (component d), 0.1-1 wt. % of a polytetrafluoroethylene having fibril-forming ability (component e) and 0.1-35 wt. % of an inorganic compound consisting essentially of silicate (component f). An internal mechanism part of printing instrument can be molded from the flame-retardant thermoplastic resin composition.

JP 08-073692 in the name of Koyama et al., provides a composition obtained by blending (A) 100 pts·wt. of a resin prepared by mixing (i) a PC resin having 16,000-29,000 viscosity-average molecular weight with (ii) a polyalkylene terephthalate resin in the weight ratio of the component (1)/(ii) of 75/25 to 90/10 with (B) 1-10 pts·wt. of a copolymer containing (i) a rubber-based copolymer and (ii) one or more selected from an aromatic vinyl monomer, a vinyl cyanide, a (meth)acrylic acid (ester) and a maleimide-based monomer as constituent components, (C) 2-10 pts·wt. of an organic phosphorus-based flame-retardant preferably composed of a condensed phosphoric ester of the formula

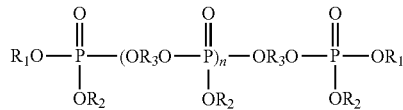

wherein $R_1$ and $R_2$ are each a monofunctional aromatic group or aliphatic group; $R_3$ is a bifunctional aromatic group; (n) is 0-15 and (D) 0.05-2 pts·wt. of a fluoro-based resin.

Yabuhara et al., in JP 2000-026741, describe a composition obtained by including (A) 100 pts·wt. of a thermoplastic resin other than thermotropic liquid crystal polymers (pref. an aromatic polycarbonate/acrylonitrile-butadiene-styrene resin), (B) 0.01-50 pts·wt. of a thermotropic liquid crystal polymer (pref. a polyester-based polymer made from a dicarboxy compound such as terephthalic acid and a dihydroxy compound such as ethylene glycol or hydroquinone), and (C) 1-30 pts·wt. of a halogen element-free phosphazene compound.

SUMMARY OF THE INVENTION

A thermoplastic molding composition containing no halogen characterized by its flame retardance is disclosed. The composition contains A) 60 to 99 parts by weight of aromatic poly(ester) carbonate and B) 1 to 20 parts per hundred parts resin (phr) of graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, C) 2 to 20 phr of a phosphorous-containing compound, and D) 0.1 to 15 parts by weight of a boron compound having average particle diameter of 2 to 10 μm.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about." Equivalent weights and molecular weights given herein in Daltons (Da) are number average equivalent weights and number average molecular weights respectively, unless indicated otherwise.

The inventive composition contains: A) 60 to 99 percent by weight (pbw), preferably 70 to 95 pbw, most preferably 70 to 85 pbw of aromatic poly(ester) carbonate having a weight-average molecular weight of at least 25,000 preferably at least 26,000 g/mol., B) 1 to 20 preferably 2 to 15, more preferably 5 to 12 most preferably 7 to 10 parts per 100 parts resin (herein phr) of a graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate components, where the weight ratio of polyorganosiloxane/poly(meth)alkylacrylate/rigid shell is 70-90/5-15/5-15, C) 2 to 20, preferably 5 to 15, particularly preferably 7 to 15, most preferably 10 to 15 phr of a phosphorus-containing compound, preferably organic phosphoric or phosphonic acid ester, and D) 0:1 to 15, preferably 1 to 10, most preferably 2 to 8 phr of a boron compound, preferably zinc borate having average particle diameter of 2 to 10 microns. The compositions of the present invention are halogen-free.

Component A

Suitable aromatic (co)polycarbonates and/or aromatic polyester carbonates are known. (Co)polycarbonates may be prepared by known processes (see for instance Schnell's "Chemistry and Physics of Polycarbonates", Interscience Publishers, 1964) and are widely available in commerce, for instance from Bayer MaterialScience under the trademark MAKROLON. Aromatic polycarbonates may be prepared by the known melt process or the phase boundary process. Aromatic dihydroxy compounds suitable for the preparation of aromatic polycarbonates and/or aromatic polyester carbonates conform to formula (I)

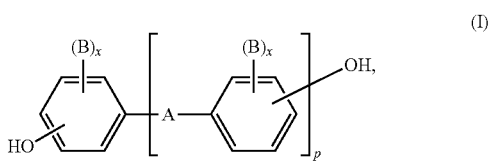

(I)

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

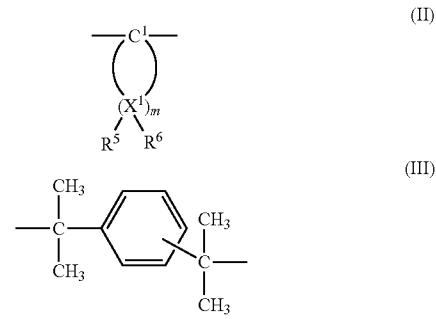

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl)ketones, bis-(hydroxyphenyl)-sulfones and α,α-bis-(hydroxyphenyl)-diisopropylbenzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxy-phenyl)-propane (bisphenol A). These compounds may be used individually or in the form of any desired mixtures.

Chain terminators suitable for the preparation of thermoplastic aromatic polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used.

The polycarbonates may be branched in a known manner, preferably by the incorporation of 0.05 to 2.0%, based on the sum of the molar amount of the aromatic dihydroxy compounds use, of compounds having a functionality of three or more, for example compounds having three or more phenolic groups.

Aromatic polyestercarbonates are known. Suitable such resins are disclosed in U.S. Pat. Nos. 4,334,053; 6,566,428 and in CA 1,173,998 all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-, 4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the thermoplastic aromatic polyester carbonates is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic aromatic poly(ester) carbonates have weight-average molecular weights (measured by gel permeation chromatography) of at least 25,000, preferably at least 26,000. Preferably, these have maximum weight-average molecular weights of 35,000, more preferably up to 32,000, particularly preferably up to 30,000 g/mol. The thermoplastic aromatic poly(ester) carbonates may be used alone or in any desired mixture.

Component B

The graft (co)polymer suitable in the context of the invention has core/shell structure. It may be obtained by graft polymerizing alkyl(meth)acrylate and optionally a copolymerizable vinyl monomer onto a composite rubber core that includes interpenetrated and inseparable interpenetrating network (IPN) type polymer of polyorganosiloxane and alkyl(meth)acrylate, preferably polysiloxane and butylacrylate. The shell is a polymeric rigid phase containing alkyl methacrylate, preferably methylmethacrylate. The weight ratio of polysiloxane/alkyl(meth)acrylate/rigid phase is 70-90/5-15/5-15, preferably 75-85/7-12/7-12, most preferably 80/10/10.

The glass transition temperature of the rubber core is preferably below 0° C., preferably below −20° C., especially below −40° C. The amount of component B present in the inventive composition is 1 to 20, advantageously 2 to 15, preferably 5 to 12, most preferably 7 to 10 phr.

The preferred rubber core has median particle size ($d_{50}$ value) of 0.05 to 5, more preferably 0.1 to 2 microns, especially 0.1 to 1 micron. The median value may be determined by ultracentrifuge measurement (W. Scholtan, H. Lange, Kolloid, Z. and Z. Polymere 250 (1972), 782-1796).

The polyorganosiloxane component in the graft (co)polymer may be prepared by reacting an organosiloxane and a multifunctional crosslinking agent in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, which may be used alone or in a mixture of 2 or more such compounds. The organosiloxane component is present in the silicone acrylate rubber in an amount of at least 70%, preferably at least 75%, based on weight of the graft (co)polymer.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

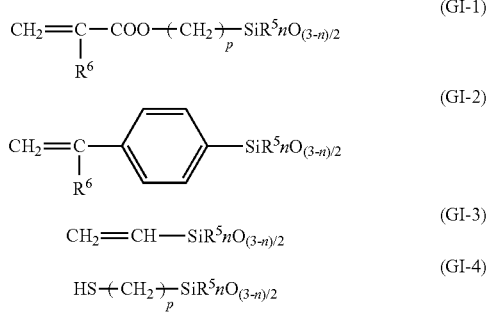

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methyl-silane, γ-methacryloyloxy-propylmethoxy-dimethyl-silane, γ-methacryloyloxypropyl-dimethoxy-methyl-silane, γ-methacryloyloxypropyl-tri-methoxy-silane, γ-methacryloyloxy-propyl-ethoxy-diethyl-silane, γ-methacryloyl-oxypropyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is suitable for forming structure GI-3. γ-Mercaptopropyldimethoxy-methylsilane, γ-mercaptopropylmethoxy-dimethylsilane, γ-mercaptopropyl-diethoxymethylsilane, etc. are suitable for forming structure GI-4.

The amount of these compounds is up to 10%, preferably 0.5 to 5.0% (based on the weight of polyorganosiloxane).

The acrylate component in the silicone acrylate composite rubber may be prepared from alkyl (meth)acrylates, crosslinkers and graft-active monomer units.

Examples of preferred alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference.

The graft polymerization onto the graft base (herein B.1) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (B.2) may be formed of a mixture of
B.2.1 0 to 80%, preferably 0 to 50%, especially 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and
B.2.2 100 to 20%, preferably 100 to 50%, especially 100 to 75% (based on the weight of the graft shell) of at least one monomer selected from the group consisting of (meth)acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth) acrylic acid ($C_1$-$C_8$)-alkyl esters, especially methyl methacrylate.

Component C

Phosphorus-containing compounds suitable in the context of the invention include oligomeric organic phosphoric or phosphonic acid esters conforming structurally to formula (IV)

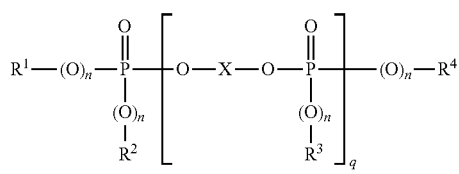

wherein
$R^1$, $R^2$, $R^3$ and $R^4$ independently one of the others, each represents $C_1$- to $C_8$-alkyl, or $C_{5-6}$-cycloalkyl, $C_{6-20}$-aryl or $C_{7-12}$-aralkyl each optionally substituted by alkyl, preferably by $C_{1-4}$-alkyl, n independently one of the others denotes 0 or 1, preferably 1, q denotes 0.5 to 30, preferably 0.8 to 15, particularly preferably 1 to 5, especially 1 to 2, and X is a mono- or poly-nuclear aromatic radical having from 6 to 30 carbon atoms, or an aliphatic radical having from 2 to 30 carbon atoms, which may be OH-substituted and may contain up to 8 ether bonds. The aliphatic radical may be linear or branched.

Preferably, $R^1$, $R^2$, $R^3$ and $R^4$ each independently of the others represent $C_{1-4}$-alkyl, phenyl, naphthyl or phenyl-$C_{1-4}$-alkyl. In the embodiments where any of $R^1$, $R^2$, $R^3$ and $R^4$ is aromatic, it may be substituted by alkyl groups, preferably by $C_{1-4}$-alkyl. Particularly preferred aryl radicals, are cresyl, phenyl, xylenyl, propylphenyl or butylphenyl.

In a preferred embodiment, X represents a mono- or poly-nuclear aromatic radical having from 6 to 30 carbon atoms. It is preferably derived from any of the aromatic dihydroxy compounds of formula (I).

X particularly preferably represents at least one member selected from the group consisting of

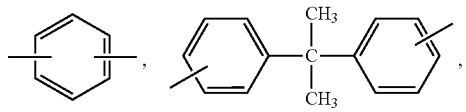

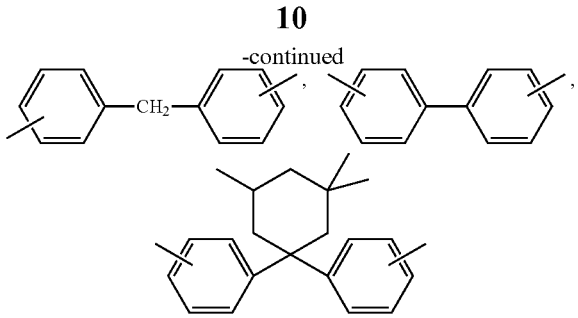

Especially, X may be derived from resorcinol, hydroquinone, bisphenol A or diphenylphenol and particularly preferably from bisphenol A.

Further suitable phosphorus-containing compounds are compounds of formula (IVa)

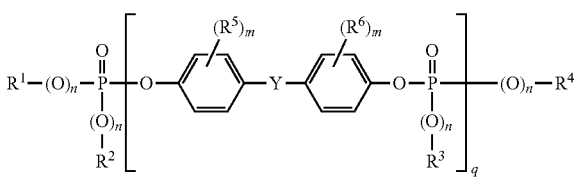

wherein
$R^1$, $R^2$, $R^3$, $R^4$, n and q are as defined for formula (IV),
m independently one of the others represents 0, 1, 2, 3 or 4,
$R^5$ and $R^6$ independently one of the others represents $C_{1-4}$-alkyl, preferably methyl or ethyl, and
Y represents $C_1$- to $C_7$-alkylidene, $C_{1-7}$-alkylene, $C_{5-12}$-cycloalkylene, $C_{5-12}$-cycloalkylidene, —O—, —S—, —$SO_2$ or —CO—, preferably isopropylidene or methylene.

Particularly preferred is

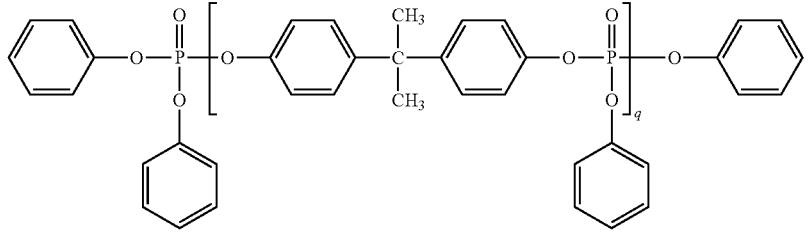

wherein q is 1 to 2.

Such phosphorus compounds are known (see, for example, U.S. Pat. Nos. 5,204,394 and 5,672,645, both incorporated herein by reference) or may be prepared by known methods (e.g. Ullmann Enzyklopklie der technischen Chemie, Vol. 18, p. 301 et seq. 1979; Houben-Weyl, Methoden der organischen Chemie, Vol. 12/1, p. 43; Beilstein Vol. 6, p. 177).

Component C is present in the inventive composition in amount of 2 to 20, preferably 5 to 15, particularly preferably 7 to 15 most preferably 10 to 15 phr.

Component D

The boron compound suitable in the context of the present invention is not particularly limited so long as it is a compound having a boron atom. Examples include boric acid, boron oxide and borates. The borates include zinc borates such as zinc tetraborate, zinc metaborate and basic zinc borate, barium borates such as barium orthoborate, barium metaborate, barium diborate and barium tetraborate, lead borate, cadmium borate and magnesium borate. Such boron compounds may be used alone or in combination as a mixture of two or more of them.

The preferred boron compound is zinc borate. The preferred zinc borate has the general chemical formula $mZnO \cdot nB_2O_3 \cdot xH_2O$ where the ratio of x/m/n is around 0-7/1-5/2-6. This borate is well known and commercially available. The average particle diameter is between 2 and 10 μm, advantageously 4 to 6 μm, alternatively 8-10 μm. Particle size and particle diameter always means the average particle diameter.

Other Components

The inventive composition may further include additives that are known for their function in the context of thermoplastic molding compositions that contain poly(ester)carbonates. These include any one or more of lubricants, mold release agents, for example pentaerythritol tetrastearate, nucleating agents, antistatic agents, thermal stabilizers, light stabilizers, hydrolytical stabilizers, fillers and reinforcing agents, colorants or pigments, as well as further (non-halogen containing) flame retarding agents or a flame retarding synergists. The inventive compositions are halogen-free.

The inventive compositions may be prepared conventionally using conventional equipment and following conventional procedures. The inventive composition may be used to produce moldings of any kind by thermoplastic processes such as injection molding, extrusion and blow molding methods.

EXAMPLES

The present invention is further illustrated, but is not to be limited, by the following examples. All quantities given in "parts" and "percents" are understood to be by weight, unless otherwise indicated.

In the preparation of exemplified compositions, the components and additives were melt compounded in a twin screw extruder ZSK 30 at a temperature profile from 120 to 280° C. The pellets obtained were dried in a forced air convection oven at 110° C. for 4 to 6 hours. The parts were injection molded (melt temperature 265 to 285° C., mold temperature about 75° C.).

In preparing the compositions described below the following components were used:
PC a bisphenol-A based homopolycarbonate having melt flow rate of about 4 g/10 min (at 300° C., 1.2 Kg) per ASTM D 1238;
ELASTOMER methyl methacrylate (MMA)-grafted siloxane (Si)-butyl acrylate (BA) composite rubber containing MMA shell and Si-BA in the core with a weight ratio of Si/BA/MMA of 80/10/10;
P-COMPOUND conforms to the following structure:

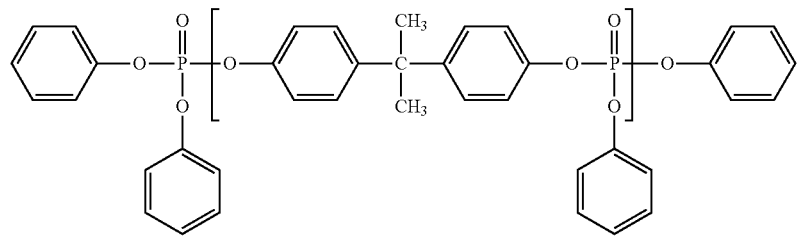

q = 1, 1

ZINC BORATE bhaving an average particle diameter of 5 microns, commercially available from Chemtura as ZB-467.

Specific optical density of smoke under flaming was determined in accordance with ASTM E662 flaming on 1.5 mm plaques with heat flux of 35 kW/m².

Cone peak heat release rate was determined in accordance with ASTM E662 on 1.5 mm plaques with heat flux of 35 kW/m².

The melt flow rates (MVR) of the compositions were determined in accordance with ASTM D-1238 at 300° C., 1.2 kg load.

Vicat temperature (VICAT) was determined in accordance with ASTM D 1525 with a load of 50 Newton and a heating rate of 120° C./hour.

Heat Deflection Temperature (HDT) was determined according to ASTM D 648 at 0.455 MPa, 120° C./h (HDT1) and at 1.82 MPa, 120° C./h (HDT2).

Notched Izod impact energy was determined according to ASTM D 256 at 23° C. on ⅛" samples.

The results of these tests are reported below in Table I.

TABLE I

|  | Ex. 1 | Ex. 2 | Ex. 3 | Ex. 4 |
|---|---|---|---|---|
| PC | 90 | 90 | 90 | 90 |
| P Compound | 10 | 10 | 10 | 10 |
| Elastomer |  | 5 |  | 5 |
| ZINC BORATE |  |  | 3 | 3 |
| MVR (cm³/10 min.) | 12.32 | 8.76 | 12.32 | 11.31 |
| HDT1 (° C.) | 110.7 | 109.35 | 110.3 | 110.05 |
| HDT2 (° C.) | 100.75 | 98.8 | 100.2 | 100 |
| VICAT (° C.) | 115.65 | 114.9 | 116.15 | 115.75 |
| Notched Izod (ft · lbf/in) | 0.886 | 17.826 | 1.112 | 12.076 |
| ASTM E662 - smoke density at 4.0 min. (DS40) | 188 | 95 | 91 | 101 |
| ASTM E662 - Cone, peak heat release rate (kW/m²) | 556.05 | 324.9 | 305.95 | 305.6 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

Various aspects of the subject matter described herein are set out in the following numbered clauses:

1. A thermoplastic molding composition comprising: A) 60 to 99 percent by weight (pbw) aromatic poly(ester)carbonate having a weight-average molecular weight of at least 25,000; B) 1 to 20 parts per 100 parts resin (phr) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15; C) 2 to 20 phr phosphorus-containing compound; D) 0.1 to 15 phr boron compound having average particle diameter of 2 to 10 microns.

2. The composition according to clause 1, wherein the aromatic poly(ester) carbonate is a homopolycarbonate based on bisphenol A.

3. The composition according to clause 1, wherein said graft (co)polymer is present in an amount of 2 to 15 phr.

4. The composition according to clause 1, wherein said phosphorous compound is a member selected from the group consisting of phosphoric acid ester and phosphonic acid ester.

5. The composition according to clause 4, wherein said member conforms structurally to formula (IV)

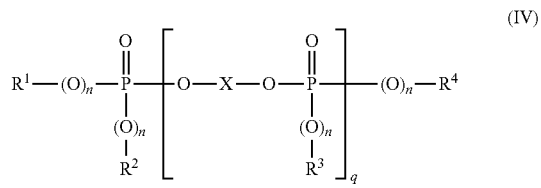

wherein $R_1$, $R_2$, $R_3$ and $R_4$ independently one of the others, each represents $C_1$- to $C_8$-alkyl, or $C_{5-6}$-cycloalkyl, $C_{6-20}$-aryl or $C_{7-12}$-aralkyl, n independently one of the others denotes 0 or 1, q denotes 0.5 to 30, and X is a mono- or poly-nuclear aromatic radical having from 6 to 30 carbon atoms, or an aliphatic radical having from 2 to 30 carbon atoms.

6. The composition according to clause 4, wherein said member conforms structurally to

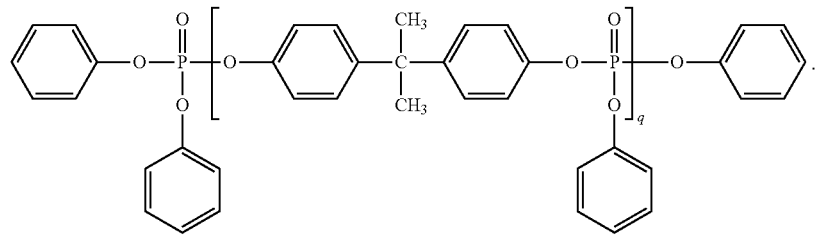

7. The composition according to clause 1, wherein said boron compound is zinc borate.

8. The composition according to clause 1, wherein said boron compound is present in an amount of 1 to 10 phr.

9. The composition according to clause 1, wherein the boron compound conforms to the general chemical formula $mZnO·nB_2O_3·xH_2O$ and where the ratio of x/m/n is 0-7/1-5/2-6.

10. The composition according to clause 1, wherein the average particle diameter is 4 to 6 μm.

11. The composition according to clause 1, wherein the average particle diameter is 8-10 microns.

12. The composition according to clause 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flame proofing agent other than component C), and flame proofing synergist.

What is claimed is:

1. A thermoplastic molding composition comprising:
A) 60 to 99 percent by weight (pbw) aromatic poly(ester) carbonate having a weight-average molecular weight of at least 25,000;
B) 1 to 20 parts per 100 parts resin (phr) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15;
C) 2 to 20 phr phosphorus-containing compound; and
D) 0.1 to 15 phr boron compound having average particle diameter of 2 to 10 microns,
wherein the composition is halogen-free.

2. The composition according to claim 1, wherein the aromatic poly(ester) carbonate is a homopolycarbonate based on bisphenol A.

3. The composition according to claim 1, wherein said graft (co)polymer is present in an amount of 2 to 15 phr.

4. The composition according to claim 1, wherein said phosphorous compound is a member selected from the group consisting of phosphoric acid ester and phosphonic acid ester.

5. The composition according to claim 4, wherein said member conforms structurally to formula (IV)

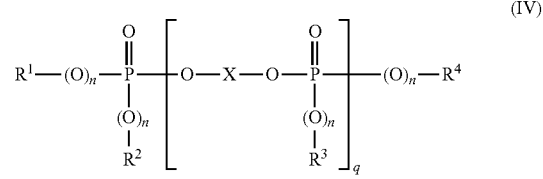

wherein
$R^1$, $R^2$, $R^3$ and $R^4$ independently one of the others, each represents $C_1$- to $C_8$-alkyl, or $C_{5-6}$-cycloalkyl, $C_{6-20}$-aryl or $C_{7-12}$-aralkyl,
n independently one of the others denotes 0 or 1,
q denotes 0.5 to 30, and
X is a mono- or poly-nuclear aromatic radical having from 6 to 30 carbon atoms, or an aliphatic radical having from 2 to 30 carbon atoms.

6. The composition according to claim 4, wherein said member conforms structurally to

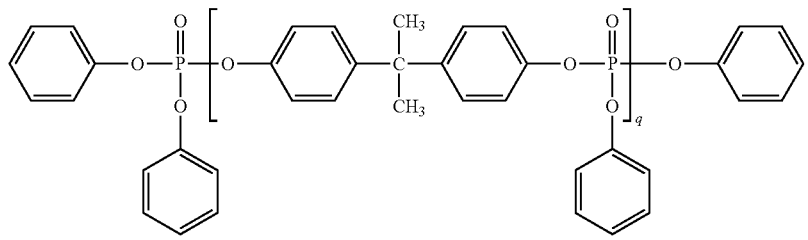

wherein q is 1 to 2.

7. The composition according to claim 1, wherein said boron compound is zinc borate.

8. The composition according to claim 1, wherein said boron compound is present in an amount of 1 to 10 phr.

9. The composition according to claim 1, wherein the boron compound conforms to the general chemical formula $mZnO \cdot nB_2O_3 \cdot xH_2O$ and where the ratio of x/m/n is 0-7/1-5/2-6.

10. The composition according to claim 1, wherein the average particle diameter is 4 to 6 μm.

11. The composition according to claim 1, wherein the average particle diameter is 8-10 microns.

12. The composition according to claim 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flame proofing agent other than component C), and flame proofing synergist.

* * * * *